P. TRIPKE.
COMBINED EGG SEPARATOR AND BEATING DEVICE.
APPLICATION FILED NOV. 20, 1915.
1,237,585.
Patented Aug. 21, 1917.
2 SHEETS—SHEET 1.
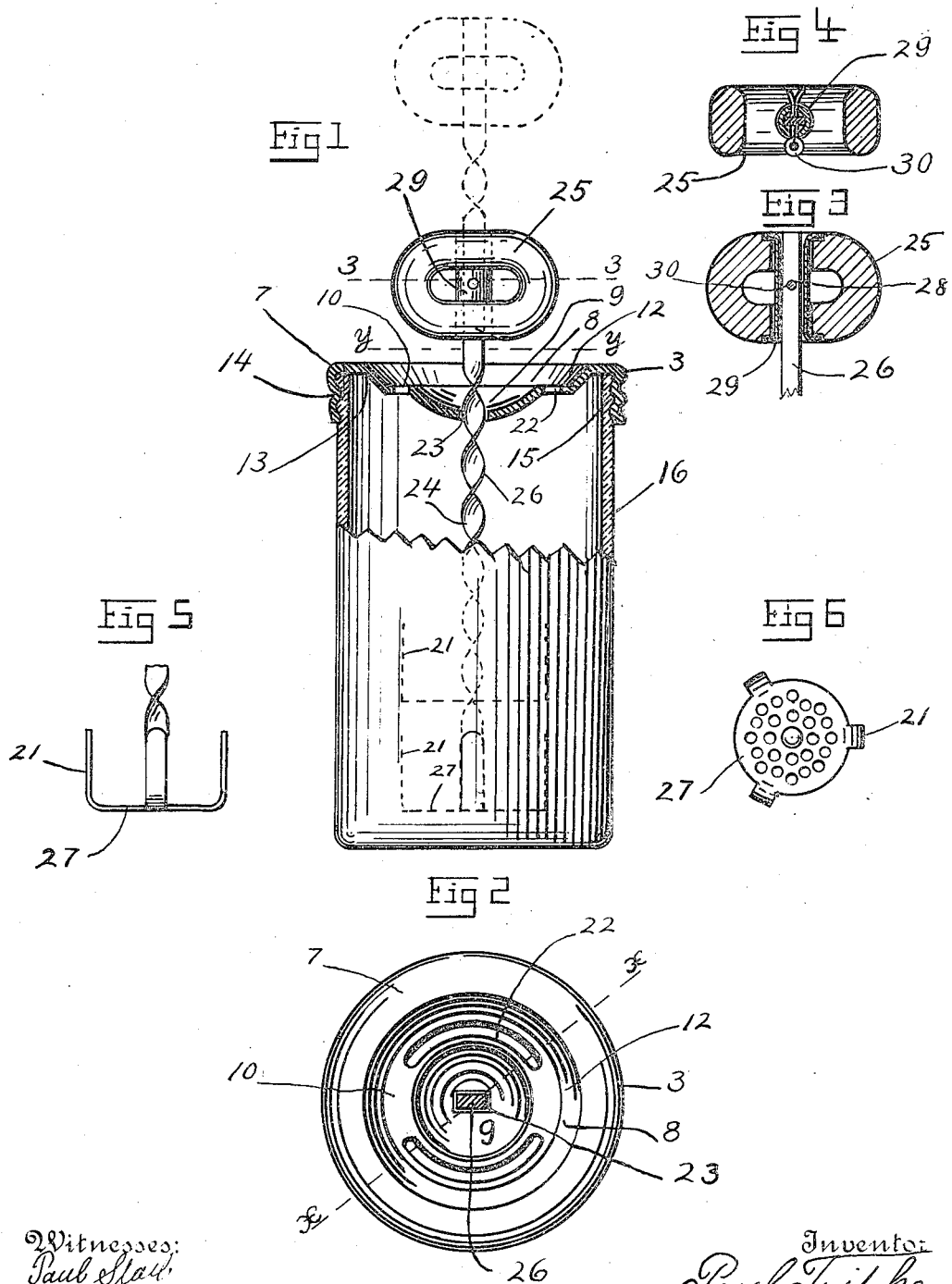

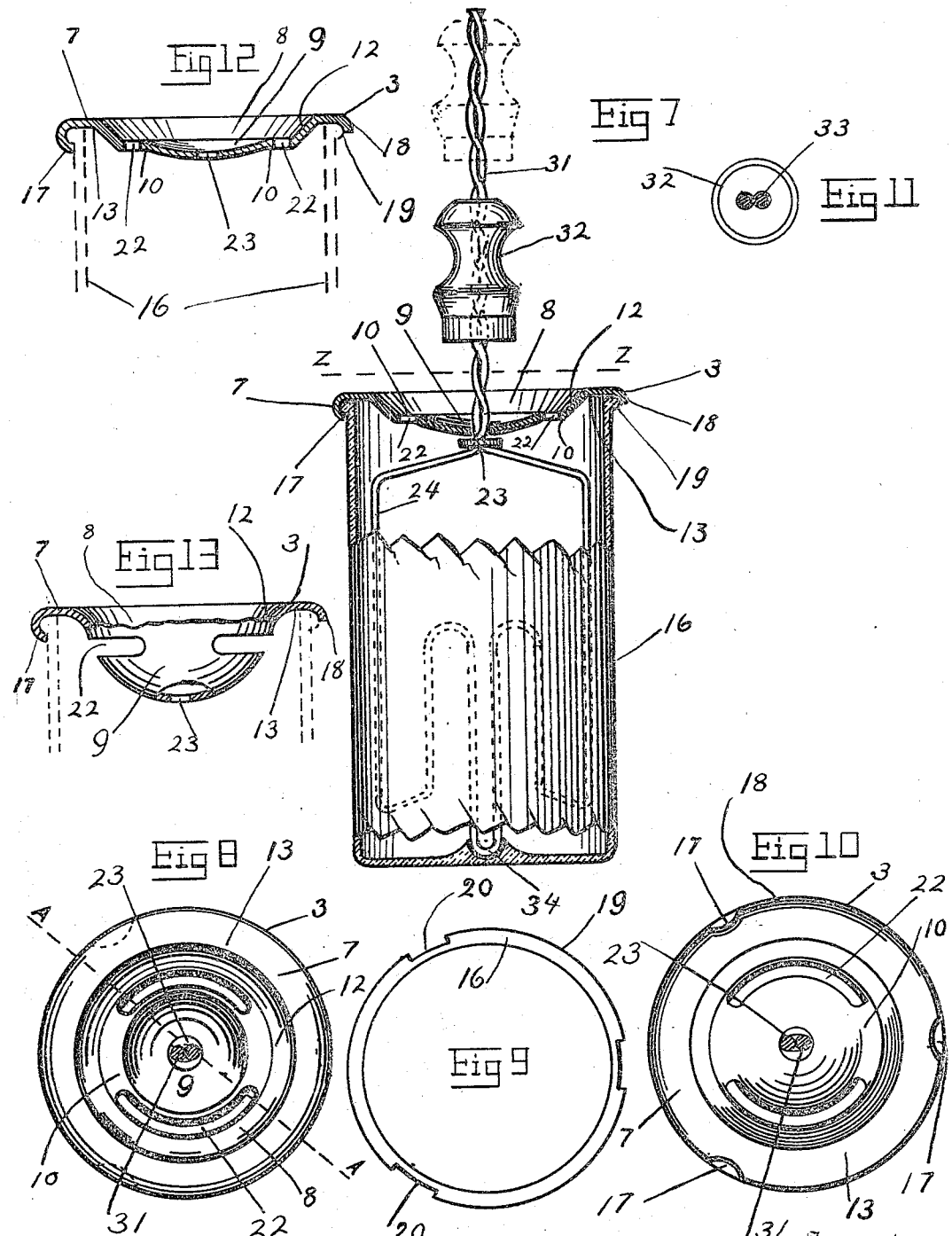

UNITED STATES PATENT OFFICE.

PAUL TRIPKE, OF JERSEY CITY, NEW JERSEY.

COMBINED EGG-SEPARATOR AND BEATING DEVICE.

1,237,585.  Specification of Letters Patent.  Patented Aug. 21, 1917.

Application filed November 20, 1915. Serial No. 62,666.

*To all whom it may concern:*

Be it known that I, PAUL TRIPKE, a citizen of the United States, and resident of Jersey City, in the county of Hudson and State of New Jersey, have invented certain new and useful Combined Egg-Separator and Beating Devices, of which the following is a specification.

My invention relates to a new article of manufacture, and the object of the same is the combination of an egg-separator-beater-closure, and a beater or mixer, whereby one article can be made to serve two or more purposes, thus saving the cost of manufacturing and time in handling separate articles or vessels for separate uses.

My invention consists in the formation of a closure or cover of a beater or mixer.

Referring to the drawings:—

Figure 1— is a vertical sectional view of my new article of manufacture—egg-separator-beater-closure—on line X X Fig. 2, showing the same screwed onto the mixing container (partly in section) with the beater mechanism inserted.

Fig. 2— is a plan sectional view on line Y. Y. Fig. 1.

Fig. 3— is a detached sectional elevation of the handle.

Fig. 4— is a plan sectional view on line 3—3 Fig. 1.

Fig. 5— is a detached side elevation of the dasher.

Fig. 6— is a bottom view of the dasher as shown in Figs. 1–5.

Fig. 7— is another sectional view of my new article of manufacture—egg-separator-beater-closure—on line A. A. Fig. 8 showing the same secured onto the mixer-container or vessel (partly in section) and the beater mechanism inserted therein.

Fig. 8— is a plan section on line Z. Z. Fig. 7.

Fig. 9— is a detached top view of the container or mixing vessel as shown in Fig. 7.

Fig. 10— is a bottom view of the beater closure as shown in Fig. 7.

Fig. 11— is a detached bottom view of the operating handle or knob of the beater mechanism as shown in Fig. 7.

Fig. 12— is a similar view to Fig. 7 showing the beater closure resting on the container with the beater removed, and ready to use as an egg-separator-container shown in dotted lines.

Fig. 13— is a partly sectional view of the closure showing the egg-separating-formation with its orifices pierced above the bowl.

Like numerals refer to like parts throughout the specification.

Numeral 3 represents my new article of manufacture as adapted and combined to co-act with a beater or mixer mechanism, as shown in Figs. 1 and 7. This article of manufacture comprises a closure or cover 7 integrally formed into an egg-separating formation 8 by stamping or forming otherwise out of one piece of metal. Other materials however can be used.

This egg separating formation comprises a receptacle which is divided into an upper and lower part, the lower part or bowl portion 9 is formed in the center of the closure or cover. Around said bowl is formed the ledge or ring 10; and around this ledge-ring is formed the upper dish-shaped part or receptacle portion 12, terminating at the resting flange 13. The outer edge of this flange is carried downward and provided with a threaded formation 14, adapted to co-act with corresponding thread formations 15 formed on the outside of the container 16.

By this means the closure is held on to the container as shown in Fig. 1. Although I have shown the above mode, I may, however, dispense therewith and use the bayonet type of securing, as shown in Fig. 7. In that case the flange 13 is provided with integral lips 17 of any number around the outer circumference thereof (see Figs. 7—10—12). The metal 18 between said lips 17 is slightly curved or curled downward (see Figs. 7—12). In order to permit the lips 17 passing over and behind the container rim 19, I provide the same with corresponding notches 20. Now by simply turning the closure on the vessel, the same will be securely locked and held thereto.

The annular ledge-ring 10 is pierced with orifices 22 of any shape, size or number. I do not however, confine myself to the ring 10 around the bowl 9 as the same can be dispensed with, and the wall of the bowl simply carried up and formed integrally with the flange 13 (see Fig. 13). In that condition the orifices 22 are pierced above the bowl 9. The bowl 9, is pierced with an orifice or guiding aperture 23 preferably in the center thereof, the shape and use of which will be explained hereafter. 24 is the beater or mixer mechanism comprising in Fig. 1 a spiral or twisted stem 26 which is adapted to pass through the bowl orifice 23. A perforated dasher 27 having beater arms 21 (see Figs. 1—5—6) and a detachable knob 25.

This knob is provided with a central hole into which loosely revolves the sleeve 29 (Fig. 3) and to prevent the same from being accidentally withdrawn, I bend over the ends of the sleeve upon the knob, which secures it in place.

Through this sleeve is inserted the free end of the operating stem or rod 26 which is held thereto by a pin 30, passing through the holes 28 cut in the sleeve and the rod.

In Figs. 1 and 2 the orifice or guiding aperture 23 is made elongated to meet the twisted condition of the beater rod or stem 26.

Now by taking hold of the detachable handle or knob 25 and reciprocating the said rod 26 up and down within the said orifice or guiding aperture 23 said beater arms and dasher are given a rotary back and forth movement by the said rod coming in contact with the walls of said orifice or guiding aperture 23.

The beater 24 in Fig. 7 is made different to that shown in Fig. 1, being constructed of bent wire, the free ends of which terminate in a twisted or spiral stem 31, which is adapted to pass through the central orifice or guiding aperture 23 in the bowl 9. On and over the said stem 31 is moved up and down the detachable handle or knob 32, which is provided with suitable openings 33 Fig. 11, to give a rotary back and forth movement to the beater, which rests on its center point 34 on the bottom and within the container.

Heretofore eggs were separated in one vessel and then beaten in another. This necessitated the use of two articles or vessels. By my egg-separator-beater-closure invention I am able to dispense with an additional vessel or article.

This will be made clear by the following explanation:

To use the egg-separator-beater-closure as an egg-separator alone, first place the same upon the container 16 (see Fig. 12) with the beater mechanism removed.

Then break an egg so that the contents thereof will fall into the bowl 9 and the dish shaped surface 12; the yolk of the egg being heavier will settle in the said bowl and fill same, while the white portion being of less specific gravity remains above, and flows through the orifices 22 of said dish-shaped surface into the container. The yolk in the bowl 9 is then poured out.

Now to use the beater mechanism in connection with the said closure for beating the above separated portion of the egg, simply pass the beater rod 26 through the guiding aperture or orifice 23 of the closure and fasten the detachable handle 25 onto said rod as shown in Fig. 1 or slip the button or handle 32 over the rod 31 as shown in Fig. 7, as the forms of the beaters may require, and then secure or rest said egg-separator-beater-closure on the container according to the formation of said closure.

The respective beaters are then operated in their particular way, and when beating or mixing is completed simply remove the closure with the beater, from the container and the beaten or mixed contents may then be removed from the container.

In cleaning my article the beater can be easily separated from the closure and the closure from the container which makes it possible to thoroughly wash and cleanse each part separately thereby rendering the article highly sanitary.

It is now obvious and clear that I have produced a new, novel, useful and sanitary article, which will serve as a closure to a beater and also perform at the same time the service of an egg-separator when required without hindering the working of the beater mechanism, but rather assist its movement; thus producing a three-fold combination article of usefulness and novelty.

I do not confine myself to any particular shape of the egg separator formation, as I am aware other shapes will produce the same results. Nor do I confine myself to the particular beater mechanism shown as I am aware others can be used.

What I claim is:—

1. A new article of manufacture comprising a beater-closure having its surface formed into an egg-separator-receptacle and a beater mechanism adapted to engage or co-act with said closure.

2. A new article of manufacture comprising a beater-closure, a container, said closure adapted to rest on said container, an egg-separator-formation integrally formed on the surface of said closure, a beater mechanism operating within said container and also adapted to co-act with the said closure.

3. A combined egg-separator-beater-closure, wherein said closure has its surface shaped into an egg-separator-formation and is pierced by a guiding aperture, and a beater mechanism adapted to engage or co-act with said aperture.

4. A new article of manufacture comprising a combined egg-separator-beater-closure, wherein the closure is formed into an egg-separator and provided with a guiding aperture and a beater mechanism having a spiral or twisted stem, said stem adapted to engage with and rotate in said aperture.

5. A new article of manufacture comprising a combined egg-separator-beater-closure, wherein said closure has its surface formed into an egg-separating-receptacle and is pierced by a guiding aperture and a beater mechanism having a spiral or twisted stem, said stem adapted to be reciprocated through said aperture to give said beater mechanism a rotary motion.

6. A new article of manufacture comprising, a beater-closure, a container, said closure adapted to be secured onto the said container, an egg-separating-formation integrally formed into the surface of said closure, a guiding aperture piercing said closure and a beater mechanism, adapted to engage or co-act with said aperture and also adapted to revolve within the said container.

7. A new article of manufacture comprising a combined egg-separator-beater-closure, wherein the surface of said closure is integrally formed into an egg-separator-formation having an egg-separating-bowl, said formation provided with orifices which at intervals encircle said bowl and pierce said closure, said bowl having a guiding aperture which also pierces said closure and a beater mechanism adapted to co-act with said aperture.

8. A new article of manufacture comprising a combined egg separator beater closure wherein the surface of said closure is formed into an egg-separating receptacle, orifices, dividing said receptacle into a lower and upper part, and at intervals pierce and encircle the said receptacle, said lower part being provided with a guiding aperture, a beater mechanism having a spiral or twisted stem, said stem adapted to be rotated in said aperture, and means for rotating said stem.

9. A new article of manufacture comprising a combined egg-separator-beater-closure wherein the surface of said closure is shaped into egg-separating-receptacle orifices, said receptacle divided into a lower and upper part by the said orifices, which at intervals pierce and encircle the said receptacle, said lower part being provided with a guiding aperture, a beater mechanism having a spiral or twisted stem, said stem adapted to be reciprocated through said aperture to give the said beater mechanism a rotary motion.

10. In a new article of manufacture a beater closure, a container, said closure adapted to rest on said container, an egg-separator formation having an egg-separating bowl integrally formed on one surface of said closure, orifices piercing said closure and partly encircling the said egg-separating-bowl, said bowl provided with a guiding aperture which also pierces said closure, a beater mechanism adapted to engage or co-act with said guiding aperture and also adapted to revolve within the said container and means for operating said beater mechanism.

11. A new article of manufacture, a beater closure, a container, said closure adapted to be secured onto the said container, one surface of said closure integrally formed into a dish having a center bowl, said bowl being partly encircled by orifices which pierce the said closure, said bowl provided with a guiding aperture which also pierces the said closure, a beater mechanism, a spiral or twisted stem of said beater mechanism arranged to be reciprocated through said aperture to give the said beater mechanism a rotary motion within the said container.

12. A new article of manufacture comprising a combined egg-separator-beater-closure wherein the surface of said closure is integrally formed into a receptacle having an egg-separating bowl, said bowl being partly encircled by orifices, said bowl provided with a guiding aperture, a beater mechanism having a spiral or twisted stem, said stem adapted to be reciprocated through said aperture to give the said beater mechanism a rotary motion, a detachable knob, said knob, detachably secured on to said spiral or twisted stem and adapted to be disengaged from said stem so as to allow the separation of the said beater mechanism from the said closure.

13. A combined egg separator-beater closure, wherein said closure has its surface shaped into an egg separator formation, and a beater mechanism adapted to engage or coact with said closure.

14. A new article of manufacture, comprising a combined egg separator-beater-closure, wherein said closure has its surface formed into an egg separator formation, a beater mechanism having a spiral or twisted stem, which is adapted to engage or coact with said closure, and a knob detachably connected to said stem.

15. A new article of manufacture, comprising a beater closure, a container, said closure adapted to rest on said container, an egg separator-formation integrally formed into the surface of said closure, a guiding aperture piercing said closure, a beater mechanism, a spiral or twisted stem of said beater mechanism, adapted to engage with and rotate in said aperture, and in the said container, and a knob detachably connected to said stem.

16. A new article of manufacture comprising a beater closure, a container, said closure adapted to be secured onto the said container, an egg-separator formation integrally formed on the surface of said closure a guiding aperture piercing said closure, a beater mechanism, a spiral or twisted stem of said beater mechanism adapted to engage with, rotate in, and reciprocate through said aperture, a knob, a revolving sleeve on said knob, said knob detachably engaged and secured on to said stem and also adapted to be disengaged from said stem.

Signed at Jersey City in the county of Hudson and State of New Jersey, this 17th day of November A. D. 1915.

PAUL TRIPKE.

Witnesses:
O. BARRITT,
W. E. BARNES.